United States Patent [19]

Schmidt-Roedenbeck et al.

[11] 4,171,613
[45] Oct. 23, 1979

[54] DEVICE FOR CONTROLLING THE ROTATIONAL SPEED OF TURBO-JET ENGINES

[75] Inventors: Heiner Schmidt-Roedenbeck; Peter Wüst, both of Überlingen, Fed. Rep. of Germany

[73] Assignee: Bodenseewerk Geratetechnik GmbH, Überlingen, Fed. Rep. of Germany

[21] Appl. No.: 841,594

[22] Filed: Oct. 12, 1977

[30] Foreign Application Priority Data

Jan. 24, 1977 [DE] Fed. Rep. of Germany ....... 2702774

[51] Int. Cl.² .............................................. F02C 9/04
[52] U.S. Cl. ........................................... 60/39.28 R
[58] Field of Search ................................. 60/39.28 R

[56] References Cited

U.S. PATENT DOCUMENTS

| | | | |
|---|---|---|---|
| 3,956,884 | 5/1976 | Eves | 60/39.28 R |
| 4,006,590 | 2/1977 | Itoh | 60/39.28 R |
| 4,018,044 | 4/1977 | Joby et al. | 60/39.28 R |
| 4,040,250 | 8/1977 | Saunders et al. | 60/39.28 R |
| 4,044,554 | 8/1977 | West | 60/39.28 R |
| 4,077,204 | 3/1978 | Itoh | 60/39.28 R |

*Primary Examiner*—Robert E. Garrett
*Attorney, Agent, or Firm*—Darbo & Vandenburgh

[57] ABSTRACT

The commanded rotational speed is compared with the actual rotational speed to produce a deviation signal. This deviation signal is multiplied by a coefficient which is determined by state variables (speed and intake pressure) of the engine and a proportional component plus an integral component of the multiplication product is employed as a control signal. This control signal is checked to make sure that it is outside critical engine states associated with the actual performance of the engine. On this control signal is superposed a signal representing the steady-state fuel flow associated with the commanded rotary speed (or under some circumstances the actual rotary speed) to determine the fuel flow rate to the engine.

5 Claims, 1 Drawing Figure

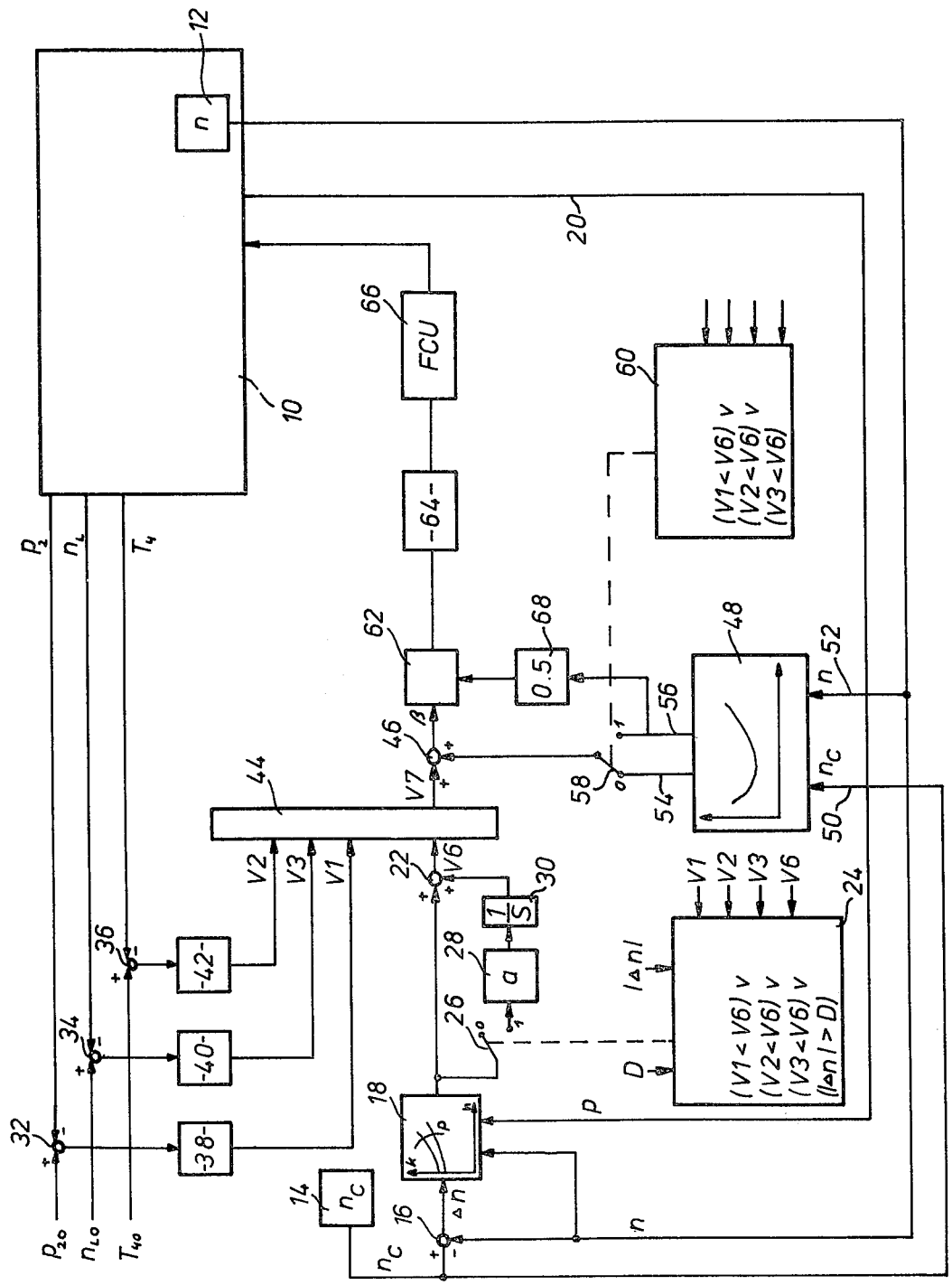

DEVICE FOR CONTROLLING THE ROTATIONAL SPEED OF TURBO-JET ENGINES

BACKGROUND AND SUMMARY OF THE INVENTION

The invention relates to a device for controlling the rotational speed of turbo-jet engines for aircraft, comprising a commanded value generator providing a commanded rotational speed signal which represents a commanded rotational speed of the high-pressure compressor of the turbo-jet engine, a tachometer generator which provides an actual rotational speed signal representing the actual rotational speed of the high-pressure compressor, means for forming the difference of these two signals as control deviation signal, a control device to which the control deviation signal is applied and which generates a control device output signal corresponding to a fuel flow rate and counteracting the control device output signal, a function generator which stores the relation between the fuel flow rates and the rotational speeds of the high-pressure compressor in accordance with the steady-state characteristics of the turbo-jet engine and provides a rate of fuel flow output signal as a function of a rotational input signal; and signal limiting means for limiting the signals determining the fuel flow rates such that sufficient distance from critical engine states, for example the surge line, is ensured.

The control of the rotational speed of turbo-jet engines throughout the whole range of rotational speeds requires a rather wide range of variation of the metered fuel flow. If a purely proportional-position control device (P control device) were used, this would result in a large deviation (proportional-deviation) between the commanded and the actual values of the rotational speed, after the rotational speed command has been executed; for a higher steady-state fuel flow is required with higher steady-state rotational speed, and a proportional-position control device can provide this higher fuel flow only if the control device output signal derived from the control deviation signal is greater than zero in the steady state. This, in turn, is only possible, if the control deviation is greater than zero in the steady state, i.e., the value of the actual rotational speed is smaller than the value of the commanded rotational speed. The proportional deviation is the smaller the larger the proportionality factor of the control device is. Only with an infinitely large proportionality factor could the proportional deviation be equal to zero. Since this cannot be accomplished in practice and for the additional reason that even increased proportionality factors already result in instability of the control loops, it is a conventional technique to connect an integral component in parallel thereto. This integral component integrates the permanent proportional control deviation until the control deviation signal equals zero, i.e., the commanded rotational speed is equal to the actual rotational speed. The use of an integrator, however, always has the effect of reducing the damping of the control loop. If certain requirements with respect to the damping must be met, it is necessary to try to relieve the control device from a major portion if its work by an open-loop control, since then the proportional and integral components of the control device can be applied with relatively low intensity only and the negative effects mentioned above can be reduced considerably.

Therefore, it is known to provide a function generator in which is stored the relation between the fuel flow and the rotational speed resulting from the characteristics of the turbojet engine for the steady state. An input signal indicative of a rotational speed causes an output signal from the function generator, said output signal representing the associated fuel flow for the steady-state ("steady fuel flow"). In the prior art device the actual rotational speed signal from the tachogenerator, which represents the actual rotational speed of the high-pressure compressor, serves as the input signal of the function generator. Thus an open-loop control signal is slaved to the respective actual rotational speed. This slaved open-loop control signal causes metering of a fuel flow which normally maintains the respective reached rotational speed independently of the control deviation. The control deviation signal is superposed on this slaved open-loop control signal.

When the rotational speed of a turbo-jet engine is to be run up in order to increase its power, an increased commanded rotational speed signal is provided by the commanded value generator, whereby the control deviation signal is increased and correspondingly a larger fuel flow is metered.

Now it could be that, with large rotational speed commands and correspondingly large control deviation signals and a slaved open-loop control signal additionally added, the fuel flow would be so large that the so-called "surge line" of the engine would be exceeded. In that event pulsations of the engine known as "surging" would occur, which would result in the destruction of the engine within a very short time (see, for example, Cohen, Rogers and Saravanamutto, "Gas Turbine Theory", Publisher Longman, London, 1972, pages 111-114). Therefore, it is known to limit the signal which determines the metered fuel flow by signal limiting means as a function of how close the respective engine operating parameters are to the surge line.

Furthermore, it is known to subject the control device output signal to limitations as a function of the engine operating parameters, for example pressures or temperatures. When such an engine parameter approaches or reaches a preselected value, the rotational speed control device output signal is eliminated by changing over to an associated limited value control loop.

It has now been found that in some cases, with the prior art slaving of the metered fuel flow to the actual rotational speed by means of the function generator, the transient time, until a commanded rotational speed is reached, is undesirably long.

It is the object of the invention to reduce the transient times in a device of the type initially defined for the control of the rotational speed of jet engines, i.e., to reduce the time required after a change of the commanded rotational speed signal to get the engine to the new commanded rotational speed. In accordance with the invention this object is achieved in that said input signal is the commanded rotational speed signal.

Thus in accordance with the invention, upon a change of the commanded rotational speed signal, the amount of fuel flow as a result of the output signal from the function generator is not slaved to the respective actual rotational speed; instead, the rate of change of the rotational speed is determined by the control deviation signal applied with low intensity and immediately a fuel flow will occur in an amount which corresponds to the new rotational speed dictated by the commanded rotational speed signal. Thereby, the jet engine, independently of the superposed control device output signal, is quickly speeded up to the new rotational speed and the transient time is reduced. The signal limiting means ensures that the increased fuel flow will not be sufficient to exceed the predetermined parameter limits of the engine but that the metered fuel flow is limited, if necessary. The engine is speeded up with a safety margin away from the surge line and without exceeding other limits. As the output signal from the function generator and corresponding to a fuel flow, but being now a function of the commanded rotational speed, only can be applied behind part of the signal limiting means for functional reasons, this output signal would ruin the effect of such limitation, in case the mentioned limitations become effective. This would result in an exceeding of the limits. In order to avoid this a further modification of the invention provides that the function generator receives the actual rotational speed signal as a second input signal and provides a second output signal which is indicative of the fuel flow associated with this actual rotational speed, and that, upon any of the said limitations becoming effective, this second output signal is superposed on the limited control device output signal instead of the output signal associated with the commanded rotational speed. This ensures that, when the limitations become effective, no larger signal may be applied at the series-connected junction of the function generator than that corresponding to the rotational speed just reached.

As inaccuracies may occur in the reproduction of the fuel flow versus rotational speed characteristic by the function generator, it is advantageous, also for this reason, that the control device output signal comprises a proportional component and an integral component, and that the integral component is switched off, when the control deviation signal exceeds a predetermined limit. The integral component is able to compensate for such inaccuracies. In the case of a limitation of the control device output signal, when a predetermined limit is approached or reached, the input to the integrator is switched off. This prevents the integral component from increasing undesirably during such a limitation, by which, among others, quick reduction of the control deviation signal is prevented. Otherwise a step-like signal, which is too high by the accumulated integral component, would be applied when the limitation is removed.

Furthermore, it is possible to supply the second output signal multiplied by a factor less than one to a maximum selector circuit to serve as extinction safety device, which circuit additionally receives the sum of the control device output signal, which may be limited, and the first or second output signal of the function generator superposed thereon. Thereby the second output signal from the function generator is utilized twice in a manner known per se.

In practice the control of the rotational speed of turbo-jet engines presents extraordinary problems since the controlled system is highly non-linear. To achieve a uniform control of the rotational speed throughout the whole range of rotational speeds of the jet engine, and a control largely unaffected by the non-linearities of the controlled system, it is furthermore advantageous if the control deviation signal is applied with a factor depending on the actual rotational speed and the total intake pressure of the turbo-jet engine to provide the control device output signal.

DESCRIPTION OF THE DRAWING

The drawing shows a block diagram of a rotational speed control device of the invention.

DESCRIPTION OF SPECIFIC EMBODIMENTS

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

Block 10 represents a turbo-jet engine which is of conventional construction and therefore is not described in detail. The rotational speed n of the high-pressure compressor is measured by means of a tachometer generator 12, which provides a corresponding actual rotational speed signal n. A commanded value generator 14 permits selection of a commanded rotational speed $n_c$ and provides a corresponding commanded rotational speed signal $n_c$. The difference $$\Delta n = n_c - n$$

is formed by a summer (or difference means) 16 as a control deviation signal.

This control deviation signal $\Delta n$ is applied to a coefficient unit 18. The coefficient unit 18 receives the actual rotational speed signal n and through conductor 20 a signal p which represents the total intake pressure of the turbo-jet engine and forms a coefficient therefrom. That coefficient is used in the coefficient unit as a multiplier for the control deviation signal $\Delta n$ to produce the output signal $k \cdot \Delta n$ of the coefficient unit. Since this coefficient depends on other state variables of the turbo-jet engine, the non-linearity of the controlled system is counteracted and a largely uniform control performance throughout the whole operating range of the turbo-jet engine 10 is achieved.

The output signal $k \cdot \Delta n$ of the coefficient unit 18 is applied directly to a summer 22. Additionally, the output signal also is applied to the summer 22 through a switch 26 controlled by a logic unit 24, a coefficient unit 28 symbolizing a constant coefficient "a", and an integrator 30 having a transfer function 1/s. Thus a controller output signal V6 is formed which comprises a proportional component from the direct application of the output signal of the coefficient unit to the summer 22 and an integral component of that output signal from its application through the switch 26 and the integrator 30. As both components are determined by the output from the coefficient unit 18, the ratio with which these components are applied is constant and is determined by the coefficient unit 28. This is essential when uniform control performance throughout the whole operating range of the turbo-jet engine is to be achieved. The "controller" which produces the output signal V6 is made up of summer 16, coefficient unit 18, switch 26, coefficient unit 28, integrator 30 and summer 22. The integral component can be switched off by logic 24 in accordance with certain criteria, as will be explained hereinbelow.

Engine parameters, namely the total pressure $p_2$ at the outlet of the high-pressure compressor or the inlet to the combustion chamber, the relative reduced rotational speed $n_L$ of the low-pressure compressor and the temperature $T_4$ at the outlet of the turbine, are measured at the turbo-jet engine 10. At subtractors 32, 34 and 36, respectively, these parameters are compared to threshold values $p_{20}$, $n_L$ and $T_{40}$, respectively. The difference signals resulting therefrom are multiplied by constants at multipliers 38, 40 and 42, respectively, resulting in signals V1, V3 and V2, respectively, which themselves constitute limit control signals.

The limit control signals V1, V3 and V2 together with the controller output signal V6 are applied to a minimum selector unit 44. The minimum selector unit 44 passes the respective smallest quantity of the quantities applied thereto. Thus if the controller output signal V6 is larger than one or more of the three limit control signals V1, V3 or V2, the smallest of these limit control signals will be used by the selector unit as its output signal. This respective smallest signal, which appears at the output of the minimum selector unit, is designated V7.

The signals V1, V2, V3, V6, $\Delta n$ and a limit value D also are applied to the logic unit 24. When either V1 is less than V6, or V2 is less than V6, or V3 is less than V6, or when $\Delta n$ is greater than D, then the logic unit 24 switches the switch 26 into its position "0", so that the output of the coefficient unit 18 is disconnected from the coefficient unit 28 and thus from the integrator 30.

The output signal V7 of the minimum selector unit 44 is applied to a summer 46. The relation between the rate of fuel flow and the rotary speed of the high-pressure compressor in accordance with the characteristic of the turbo-jet engine for the steady-state is stored in a function generator 48. When fuel flow at a given rate is supplied to the turbo-jet engine 10, an associated rotary speed n will be established as steady-state. Also, fuel flow at a particular rate, not necessarily the same as said given rate, is required in order to maintain the turbo-jet engine at the selected rotary speed n. When a signal indicative of a rotary speed is applied to the function generator 48, then the function generator will provide an output signal representing the rate of fuel flow required to maintain that speed n.

In the illustrated embodiment, the function generator 48 has two inputs 50 and 52 to each of which an input signal may be applied, and two outputs 54 and 56, respectively, at which the output signals associated with the input signals appear. A change-over switch 58, controlled by a logic 60, permits the output 54 or the output 56 optionally to be applied to the summer 46. The commanded rotary speed signal $n_c$ is applied to the input 50. Accordingly, a signal which represents the "steady-state fuel flow rate" associated with the commanded rotary speed appears at the output 54. The actual rotary speed signal n is applied to the input 52. Accordingly, a signal which represents the steady-state fuel flow associated with the actual rotary speed of the high-pressure compressor appears at the output 56. The switch 58 is switched into the position "1" by the logic 60, when either V1 is less than V6, or V2 is less than V6, or V3 is less than V6, thus when the control device output signal V6 is subjected to a limitation by the minimum selector unit 44.

When the control device output signal V6 is not limited, a signal from output 54 is superposed on this control device output signal V6=V7 in the summer 46, said signal from output 54 representing the steady-state fuel flow associated with the commanded rotary speed. The signal $\beta$ thus obtained from summer 46 represents the fuel flow rate, if signal limitations or the like are disregarded, in response to a commanded value and is applied to a fuel control unit (FCU) 66 through a maximum selector circuit 62 and signal limiting means 64. Fuel control unit 66 supplies a corresponding fuel flow to the turbo-jet engine.

In addition to the signal $\beta$, the output 56 from the function generator 48 is applied to the maximum selector circuit 62 through a coefficient unit 68, which represents a coefficient less than 1, for example 0.5. This ensures that, with a drop of $\beta$ for some reason, always at least half of the fuel flow will be supplied, which is associated with the instantaneous rotary speed n as steady-state fuel flow. This additional task is also taken over by the function generator.

The signal limiting means 64 limits the fuel flow rate to an amount such that "surging" of the turbo-jet engine is safely prevented.

The description hereinabove explains the invention on the basis of processing analog signals. It is also possible to provide a digital computer, in known manner, which processes the digitalized signals correspondingly. In this case the blocks in the figure symbolize computing and storage operations.

We claim:

1. An apparatus for controlling the rotational speed of an aircraft turbo-jet engine, which engine has a compressor, said apparatus comprising: a commanded value generator providing a commanded rotational speed signal representing a commanded rotational speed of said compressor; compressor speed means for providing an actual rotational speed signal representing the actual rotational speed of said compressor; difference means connected to the commanded value generator and to the compressor speed means to receive said signals therefrom and to form a control deviation signal from the difference of said signals; controller means connected to said difference means to receive said control deviation signal, said controller means providing a controller output signal from said control deviation signal; function generator means for storing the relation between fuel flow rates and rotational speeds of said compressor in accordance with the steady-state characteristics of the turbo-jet engine and for providing a fuel flow output signal as a function of a rotational speed input signal to the function generator means; combining means connected to the controller means and to the function generator means for combining said controller output signal from said controller means and said fuel flow output signal from said function generator means as an engine fuel flow rate signal; a fuel control unit for metering the fuel supplied to the engine in accordance with an input signal applied thereto; and connecting means connecting said combining means and said fuel control unit for applying said engine fuel flow rate signal to said fuel control unit as said input signal to said fuel control unit, said connecting means including limiting means for limiting said engine fuel flow rate signals such that sufficient distance from the surge line is ensured; said apparatus being characterized by:
   means connecting said commanded value generator and said function generator means for applying said commanded rotational speed signal to said function generator means as said rotational speed input signal.

2. An apparatus as set forth in claim 1, and wherein said engine supplies signals representing critical engine parameters, including comparison means connected to said engine to receive said supplied signals for comparing said critical parameters to associated threshold values and for providing difference signals, means connected to said comparison means for providing limit control signals from said difference signals, and minimum selector means connected to the last mentioned means and to said controller means to receive said limit control signals and said controller output signal to produce a limiter output signal representing the respective smallest signal applied, said minimum selector means being connected between the function generator means and the combining means to supply only said limiter output signal to said combining means, further characterized by:

means connecting said compressor speed means and said function generator means for applying said actual rotational speed signal as an input signal to said function generator means;

said function generator means providing another output signal representing the steady-state fuel flow associated with the actual rotational speed;

logic means connected to said means for providing limit control signals and to controller means and responding to any of said limit control signals becoming smaller than said controller output signal;

said connecting means being connected to said logic means and including means for providing an alternative engine fuel flow rate signal, applying said alternative engine fuel flow rate signal to said fuel control unit through said limiting means upon said logic means so responding.

3. An apparatus as set forth in claim 2, wherein said controller means comprises:

coefficient means which so receives said control deviation signal and provides a first component of said controller output signal proportional to said control deviation signal;

integrating means connected to said coefficient means for providing a second component of said controller output signal proportional to the time integral of said control deviation signal;

summer means connected to said coefficient means and said integrating means for combining said first and second components to provide said controller output signal; and means, connected between said coefficient means and said integrating means and connected to receive said control deviation signal, for disabling said integrating means when said control deviation signal exceeds a given threshold.

4. An apparatus as set forth in claim 3, wherein the last mentioned means comprises logic means connected to said means for providing control limit signals and to said summer means for disabling said integrating means in the event that any of said limit control signals becomes smaller than said controller output signal and in the event that said control deviation signal exceeds said threshold.

5. An apparatus as set forth in claim 1, wherein said controller means comprises:

coefficient means which so receives said control deviation signal and provides a first component of said controller output signal proportional to said control deviation signal;

integrating means connected to said coefficient means for providing a second component of said controller output signal proportional to the time integral of said control deviation signal;

summer means connected to said coefficient means and said integrating means for combining said first and second components to provide said controller output signal; and means, connected between said coefficient means and said integrating means and connected to receive said control deviation signal, for disabling said integrating means when said control deviation signal exceeds a given threshold.

* * * * *